United States Patent [19]

Köpke et al.

[11] 3,970,265

[45] July 20, 1976

[54] SAFETY BELT WINDING DEVICE

[75] Inventors: Wilfried Köpke, Sulfeld; Günter Hoffmann, Gifhorn, both of Germany

[73] Assignee: Volkswagenwerk Aktiengesellschaft, Wolfsburg, Germany

[22] Filed: Mar. 6, 1975

[21] Appl. No.: 556,093

[30] Foreign Application Priority Data

Apr. 25, 1974 Germany............................ 2419937

[52] U.S. Cl. .................... 242/107.4 A; 242/107.4 B
[51] Int. Cl.² ........................................... A62B 35/02
[58] Field of Search ............. 242/107.4 A, 107.4 B; 297/386, 387, 388; 280/150 SB

[56] References Cited

UNITED STATES PATENTS

| | | | |
|---|---|---|---|
| 3,741,494 | 6/1973 | Fiala | 242/107.4 R |
| 3,790,099 | 2/1974 | Beller | 242/107.4 R |
| 3,802,642 | 4/1974 | Klink | 242/107.4 A |
| 3,857,528 | 12/1974 | Fiala | 242/107.4 R |

FOREIGN PATENTS OR APPLICATIONS 2,064,710 7/1972 Germany ..................... 242/107.4 A

*Primary Examiner*—Edward J. McCarthy
*Attorney, Agent, or Firm*—Brumbaugh, Graves, Donohue & Raymond

[57] ABSTRACT

The winding device for a vehicle safety belt comprises a housing, a sleeve rotatable in the housing and spring-biased to wind up the safety belt, a ratchet wheel with ratchet teeth arranged at one end of the sleeve, counter teeth disposed on the housing, a catch wheel with catch teeth arranged between the ratchet wheel and housing and being displaceable into a locking position of simultaneous engagement with the ratchet teeth and counter teeth, tension limiting means connecting the ratchet wheel for rotation with the sleeve supporting the safety belt and consisting of a torsion bar extending coaxially through the sleeve and connected at one end thereof with the sleeve and at the other end with the ratchet wheel, and means for retaining the ratchet wheel at the end of the sleeve such that the sleeve is torsionally rotatable but not axially displaceable relative to the ratchet wheel.

3 Claims, 2 Drawing Figures

SAFETY BELT WINDING DEVICE

BACKGROUND OF THE INVENTION

This invention relates to a winding device for a vehicle safety belt having a housing, a sleeve rotatable in the housing and spring-biased to wind up the safety belt, a ratchet wheel with ratchet teeth arranged at one end of the sleeve, counter teeth disposed on the housing, a catch wheel with catch teeth arranged between the ratchet wheel and housing and being displaceable into a locking position of simultaneous engagement with the ratchet teeth and counter teeth, and tension limiting means connecting the ratchet wheel for rotation with the sleeve supporting the safety belt and consisting of a torsion bar extending coaxially through the sleeve and connected at one end thereof with the sleeve and at the other end with the ratchet wheel.

During rapid deceleration of the vehicle, such as on impact with another object, the body of the passenger seated in the vehicle is thrown against the restraining safety belt, thereby subjecting the body to dangerously high forces. In safety belt winding devices, it is known that these forces may be dissipated through use of a torsion bar placed between the sleeve carrying the safety belt and the ratchet wheel which on impact becomes locked in engagement with the safety belt winding device housing, as shown in German Offenlegungsschrift No. 2,064,710, for example. When pre-determined, acceptable belt forces are exceeded, the torsion bar placed between the sleeve and ratchet wheel is twisted thereby absorbing energy.

However, it has been found that when the torsion bar is twisted, it undergoes an increase in axial length. The lengthening of the torsion bar may result in disengagement of the ratchet wheel from its locking position due to the lengthening torsion bar's lifting the ratchet wheel away from the locking catch wheel interposed on the sleeve between the ratchet wheel and the safety belt housing. Such disengagement seriously impairs the operability and effectiveness of the safety belt winding device as a whole.

SUMMARY OF THE INVENTION

The present invention is directed to a safety belt winding device which maintains positive locking engagement of the ratchet wheel with the catch wheel and safety belt housing despite the twisting and lengthening of the torsion bar. In accordance with the invention, means are arranged to retain the ratchet wheel at the end of the sleeve carrying the safety belt such that the sleeve is torsionally rotatable but not axially displaceable relative to the ratchet wheel.

In a preferred embodiment of the inventive winding device, the torsion bar ends are squared and are held in corresponding square guides at one end of the sleeve and in the ratchet wheel, respectively. The square guides thus constrain the bar ends from rotational movement relative to the sleeve and ratchet wheel, respectively, while simultaneously permitting sliding displacement of the bar ends in the square guides along the torsion bar's longitudinal axis.

Further, the sleeve is provided at the end opposite the torsion bar-bearing end with a radially flanged collar disposed in a bore of the ratchet wheel. An abutting ring is fitted into a circumferential groove on the inner walls of the bore adjacent the collar, thereby securing the flanged collar on the sleeve end within the bore of the ratchet wheel.

This simple construction, which requires very little structural space, holds the sleeve torsionally connected to but not axially displaceable from the ratchet wheel, and thus ensures effective functioning of the ratchet locking mechanism and positive limitation of excessive restraining forces exerted by the belt on the vehicle occupant during abrupt deceleration.

BRIEF DESCRIPTION OF THE DRAWINGS

For a better understanding of the invention, the following description explains in detail the further advantages and essential features of a preferred embodiment, taken in conjunction with the accompanying drawings, of which.

DESCRIPTION OF THE PREFERRED EMBODIMENT

Figure 1:
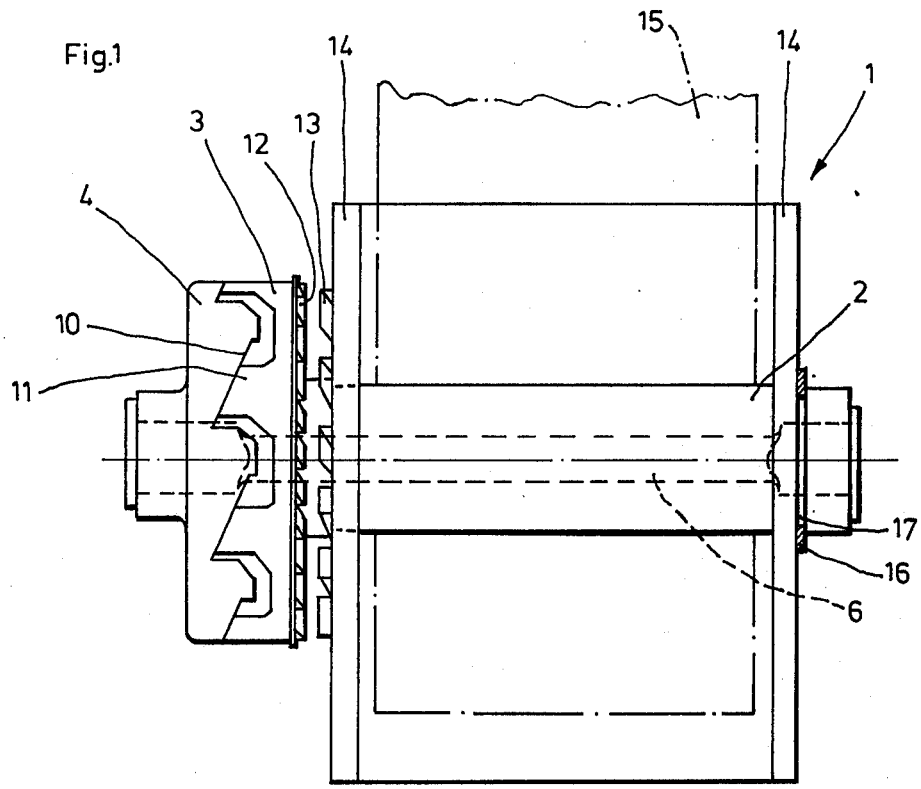
FIG. 1 is a plan view of a safety belt winding device.

FIG. 1 illustrates a winding device according to the present invention in which a safety belt 15 is wound up on a sleeve 2 which is rotatably held by lateral walls 14 of a safety belt housing 1 anchored to the vehicle body. A retaining ring 16 is maintained in an annular groove about one end of the sleeve 2 (seen more clearly in FIG. 2) to prevent lateral movement of the sleeve 2 relative to the housing 1. The sleeve 2 is spring-loaded, though not shown in the drawing, such that the safety belt 15 is constantly subjected to a small, belt-retracting pretension.

Figure 2:
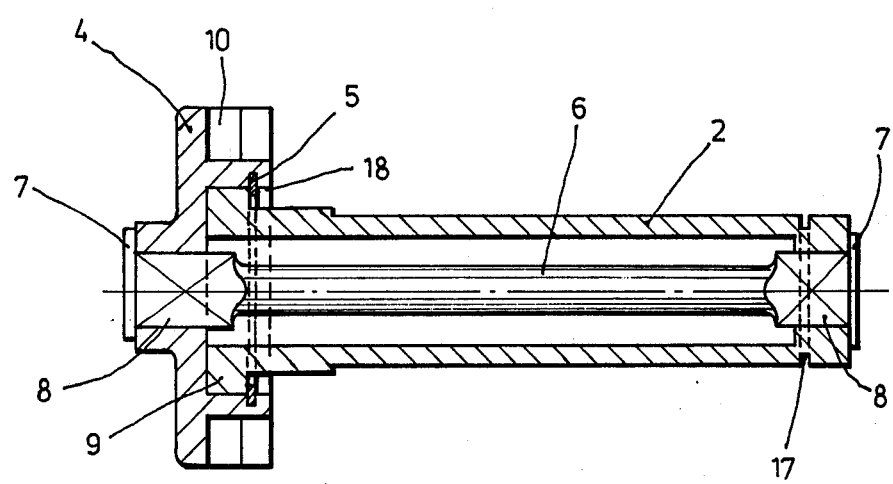
FIG. 2 is a longitudinal section through the sleeve and ratchet wheel of the winding device in FIG. 1.

As seen in FIG. 2, a torsion bar 6 extends coaxially through the sleeve 2 and is provided at both its ends with square nodes 8 disposed within square guides formed at one end of sleeve 2 and in a ratchet wheel 4, respectively. Safety discs 7 are fastened to the ends of the torsion bar 6 in order to secure the torsion bar at its normal length from axial displacement.

The ratchet wheel 4 in FIG. 1 has ratchet teeth 10 arranged coaxially with the sleeve 2 and meshed with corresponding catch teeth 11 on an axially displaceable catch wheel 3 supported on the sleeve 2. On the side opposite catch teeth 11, the catch wheel 3 is provided with a second set of catch teeth 12 associated with corresponding counter teeth 13 on one of the lateral walls 14 of the housing 1.

As further shown in FIG. 2, one end of sleeve 2 is provided with a radially flanged collar 9 supported in a bore 18 of the ratchet wheel 4 and secured against axial displacement therein by an abutting ring 5. Accordingly, the sleeve 2 will be able to rotate torsionally with respect to ratchet wheel 4 but will be constrained from axial displacement relative to the ratchet wheel 4 by means of abutting ring 5.

The operation of the winding device represented in the drawing and described above is explained as follows. During normal use of the belt, the winding device will assume the position shown in FIG. 1 wherein the sleeve 2 rotates freely relative to the housing 1. Accordingly, when the free end of safety belt 15 is pulled, the belt can be unwound as desired. Due to the spring loading of sleeve 2, not shown in the drawing, any unnecessary slack in belt length is automatically wound up again. During these rotations of the sleeve 2, the ratchet wheel 4 is connected with the sleeve 2 by means of the torsion bar 6 also rotates freely, since under normal conditions the first set of catch teeth 11 is meshed with ratchet teeth 10, as shown in FIG. 1, whereby the catch wheel 3 is driven and rotates freely along with ratchet wheel 4.

Upon rapid deceleration of the vehicle, such as on impact with another object, the body of the passenger is thrown against the safety belt 15 causing the belt to be abruptly taken off the winding device. In the operation of the ratchet mechanism, this abrupt tug on the safety belt 15 imparts a sharp rotational impulse to the sleeve 2 and the ratchet wheel 4. Due to the inclined flanks of ratchet teeth 10, the first set of catch teeth 11 is slidingly driven up the inclines of ratchet teeth 10, whereby catch wheel 3 is axially displaced toward the lateral wall 14 bearing the counter teeth 13 of the housing 1. The second set of catch teeth 12 thereupon becomes engaged with counter teeth 13 such that the ratchet wheel 4 becomes locked in position and prevented from further rotation. Inasmuch as the sleeve 2 supporting the safety belt 15 is connected by way of the torsion bar 6 with the ratchet wheel 4, the locking of the winding mechanism prevents the safety belt from further extension.

The torsion bar 6 now prevents, e.g. in case of frontal impact, the safety belt locked through the winding device from exerting dangerously high forces on the body of the vehicle occupant. When a predetermined stress load is exceeded, sleeve 2 is torsionally rotated relative to ratchet wheel 4 through the twisting of the torsion bar 6 secured between these two structural components. Thus the safety belt restraining the body of the passenger does not yield until the limit load is attained, and, on exceeding that limit load, yields while absorbing energy through the elastic deformation of torsion bar 6. The space present in the vehicle is used during the forward displacement of the occupant.

In accordance with the present invention, the torsion bar 6, lengthened by the twisting described above, is prevented from displacing the ratchet wheel 4 out of locking engagement with catch wheel 3 and housing 1 by means of the radially-flanged collar 9 inserted in the bore 18 of ratchet wheel 4 and secured there by abutting ring 5. Thus, the ratchet wheel 4 is non-displaceably fixed in axial relation to the sleeve 2. Lengthening of the torsion bar 6 is absorbed through the sliding displacement of the square nodes 8 of torsion bar 6 in the square guides of the ratchet wheel 4 and the sleeve 2, respectively. The locking and tension limiting functions of the safety belt winding device is thereby assuredly rendered effective and unimpaired.

It will be understood that the above described embodiment is merely exemplary and that those skilled in the art may make many variations and modifications without departing from the spirit and scope of the invention. All such modifications and variations are intended to be within the scope of the invention as defined in the appended claims.

We claim:

1. A winding device for a vehicle safety belt comprising, in combination:
   a. a housing;
   b. a sleeve for supporting a wound-up safety belt, said sleeve being retained for rotation within said housing and being spring-biased in a direction tending to wind the safety belt;
   c. a ratchet wheel arranged at one end of said sleeve and having ratchet teeth disposed thereon coaxially with said sleeve;
   d. counter teeth disposed on said housing coaxially with said sleeve; a catch wheel arranged between said ratchet wheel and said housing and having catch teeth disposed for selective engagement with said ratchet teeth and said counter teeth, said catch wheel being displaceable into a locking position of simultaneous engagement with said ratchet teeth and said counter teeth;
   f. safety belt tension limiting means connecting said ratchet wheel for rotation with said sleeve, said means including a torsion bar extending coaxially through said sleeve and connected at one end thereof for torsional movement with said sleeve and at the other end with said ratchet wheel; and
   g. means for retaining said ratchet wheel at an end of said sleeve adjacent said ratchet wheel such that said ratchet wheel is held torsionally rotatable but not axially displaceable relative to said sleeve.

2. A safety belt winding device according to claim 1, in which said sleeve, at the end adjacent said ratchet wheel, is provided with a radially-flanged collar which is held axially non-displaceably in a bore of said ratchet wheel.

3. A safety belt winding device according to claim 2, in which an abutting ring is provided in the walls of said bore in said ratchet wheel for securing said radially-flanged collar of said sleeve within the bore of said ratchet wheel.

* * * * *

UNITED STATES PATENT AND TRADEMARK OFFICE
CERTIFICATE OF CORRECTION

PATENT NO. : 3,970,265

DATED : July 20, 1976

INVENTOR(S) : Wilfried Köpke and Günter Hoffmann

It is certified that error appears in the above-identified patent and that said Letters Patent are hereby corrected as shown below:

Column 2, line 28, after "annular groove" insert --17--;
Column 2, line 68, delete "is".

Signed and Sealed this

First Day of February 1977

[SEAL]

Attest:

RUTH C. MASON
Attesting Officer

C. MARSHALL DANN
Commissioner of Patents and Trademarks